March 18, 1952  S. R. CARSON  2,589,339
WINDSHIELD WIPER BLADE
Filed April 24, 1946
INVENTOR.
STANLEY R. CARSON Patented Mar. 18, 1952

2,589,339

UNITED STATES PATENT OFFICE 2,589,339

WINDSHIELD WIPER BLADE

Stanley R. Carson, Dayton, Ohio, assignor to General Motors Corporation, Detroit, Mich., a corporation of Michigan Application April 24, 1946, Serial No. 664,660

3 Claims. (Cl. 15—245)

This invention relates to windshield wipers and is particularly concerned with windshield wiper blades of the type used to wipe curved surfaces such as, curved windshields.

It is, therefore, an object of the invention to provide a windshield wiper blade which will follow the surface of a curved windshield through flexing of the wiper blade so that all portions of the blade are maintained in contact with the windshield. In connection with the above object, it is a further object to provide a resilient backbone for the wiper blade which consists of a strip of resilient metal which is normally curved and which has a radius less than the smallest radius of the windshield whereby when the wiper is pressed against the windshield, it contacts throughout its full length.

Another object of the invention is to provide a backbone for a windshield wiper blade wherein a resilient metal strip is utilized which varies in cross section throughout its length whereby the greatest cross section is present at the point of support and wherein the cross section progressively reduces as the distance from the point of support increases.

Another object of the invention is to provide a resilient rubber-like member or wiper to be used in connection with the backbone and thereby form said wiper blade, which resilient rubber-like member includes an air cushion therein, said cushion being formed by the sealing of the member at the ends thereof whereby air under atmospheric pressure is entrapped and maintained within the wiper portion of the blade. The blade through its resiliency and the air cushion resists a permanent set when held in contact with the windshield for long periods of time.

Further objects and advantages of the present invention will be apparent from the following description, reference being had to the accompanying drawings, wherein preferred embodiments of the present invention are clearly shown.

In the drawings:

Fig. 1 is a plan view of the backbone of a windshield wiper blade.

Fig. 2 is a side view of the backbone shown in Fig. 1.

Fig. 3 is a section taken on line 3—3 of Fig. 2 showing one of the clips after formation thereof.

Fig. 4 is a sectional view of the windshield wiper blade taken on line 4—4 of Fig. 5.

Fig. 5 is a fragmentary view preferably in section of a windshield wiper blade showing the construction of the blade.

Fig. 6 is a section of the rubber-like material used in the wiper as it is molded or extruded and before formation thereof.

Fig. 7 is a view of the windshield wiper blade in formed condition prior to application to an automobile windshield showing the support clips and approximate curvature of the blade.

Fig. 8 is a plan view of a modified blade with a single point of support.

Fig. 9 is a cross section of the wiper blade showing the modification thereof.

In future construction of automobiles, the use of a curved windshield will be prevalent due to the improved nature of the windshield whereby glare from headlights is markedly reduced through the elimination of flat surfaces on the windshield. Such windshields will obviously present a considerable wiping problem since the blade of the windshield wiper will necessarily have to wipe over a surface having a changing radii and must follow such changing radii throughout the movement of the blade. In my copending application with Frederick W. Sampson, Serial No. 638,557, filed December 31, 1945, I have shown a windshield wiper blade which produces satisfactory wiping over a curved surface windshield. The present invention is directed to a similar type of apparatus wherein improvements have been incorporated in the blade which are desirable in some cases and which in most instances, reduce the cost of manufacture of the blade.

Referring to the drawings, in Fig. 1, I show a backbone 20, for a windshield wiper blade, which may be stamped out of a flat strip of metal and thereafter formed to the desired shape. The strip preferably includes in its flat condition a series of notches as at 22 on either side thereof. The tangs 24 of said notches form clips when bent to the position shown in Fig. 3. The main backbone portion of the blade designated at 26 is varying in width as noted from the drawing. The greatest width of the backbone 26 is found at the points where the support for the blade is provided as at 28 and 30. These points of support are also points of attachment for a windshield motor through a suitable connecting link not shown. Thus the backbone 26 of the blade 20 is relatively wide at points 28 and 30 and tapers progressively with reduced cross section as the distance from said points of support increases to the exact center of the blade and at the ends of the blade the cross section is the least. This particular construction aids flexing of the backbone, which after formation, is in an arc as shown in Fig. 7 which arc has a radius less than the smallest radius of the windshield to be wiped. The tapered backbone permits greater resiliency in the backbone at points remote from the supports wherein the pressure of the normal spring operated member which connects the blade to the wiper motor is transmitted to the blade. In other words, greatest pressure from the support is provided at points 28 and 30 and as the distance from these points increases the pressure from the main support or supports reduces and, therefore, by increasing the resiliency and decreasing the pressure required for flexing the backbone at points away from the support, greater opportunity is obtained for the blade to stay in complete contact with the windshield. The wiper itself is made of some rubber-like material such as, rubber, Vinylite or other plastic materials that are of a suitable resiliency and have good weather resisting characteristics. The wiper 32 is preferably formed with a cross section as shown in Fig. 6. In this manner, the wiper may be extruded or molded. The two end portions of the wiper 32 as shown at 34 and 36 are identical and are connected by a thin section 38 with the wiper portion 40. When the wiper 32 is curled up longitudinally it takes a shape as shown in Fig. 4. In this instance, the end portions 34 and 36 form a plug which is held between clips 24 of the backbone. Preferably cement is smeared along the contacting surfaces so that when the blade is curled it is air tight along its longitudinal joint. I preferably also seal the blade at its end portions, such sealing means being shown in Fig. 5 at 42. In this instance the ends of the wiper 32 are either clamped or held together by the aid of cement or the blade is molded with sufficient stock at the ends so that the ends are closed when the molding is curled, which closure is maintained through cement, or plugs may be inserted in the ends and cemented in place. In all instances, air under atmospheric pressure is sealed within the blade and acts in conjunction with the resiliency of the material in the blade to maintain the shape of the blade under spring pressure against the windshield. In this manner, the blade is substantially prevented from taking a permanent set in any one position on the windshield whereby improper wiping would result. It is apparent that a change in cross section of the blade may be made if desired, for example, instead of a single wiping surface 40 several of such surfaces may be provided as shown in Fig. 9 all of which comes within the scope of my invention. The main points are that the backbone of the wiper blade has varying resiliency with the greatest resiliency at portions thereof away from the supporting member and that the wiper itself includes a sealed air cushion therein to prevent a permanent set being taken by the wiper. Fig. 8 shows a modified backbone 50 with a single point of support 52. In this embodiment, the backbone 50 is tapered as in the case of backbone 26 and the same principle of operation is present.

While the forms of embodiments of the present invention as herein disclosed, constitute preferred forms, it is to be understood that other forms might be adopted, all coming within the scope of the claims which follow.

What is claimed is as follows:

1. A windshield wiper blade, comprising in combination; a resilient wiper of tubular cross section, said wiper being hermetically sealed so that the tubular portion thereof contains air under atmospheric pressure, a spring metal backbone for carrying said wiper, said backbone including a plurality of integral and spaced attachment clips throughout its length, said clips being used to clamp the wiper to the backbone, and attachment means associated with the backbone for attaching the windshield wiper blade to a windshield wiper motor, said backbone having an ever-decreasing cross sectional area as the distance from said attachment means increases whereby certain portions of the backbone are more easily flexed than other portions thereof.

2. A flexible windshield wiper blade, including in combination; an elongated resilient wiper element, a normally curved flat spring metal backing member having its broad dimension substantially parallel to the direction of windshield wiper movement; said backing member secured along said wiper element, attaching means located intermediate the ends of said backing member capable of mechanically connecting said backing member to windshield wiper driving means, said backing member having its broad dimension tapered toward both ends thereof, whereby the end portions of the blade are more easily flexed than the center portion thereof.

3. A flexible windshield wiper blade, including in combination; an elongated resilient wiper element, a normally curved flat spring metal backing member having its broad dimension substantially parallel to the direction of windshield wiper movement, said backing member having a multiplicity of projections depending therefrom from both sides thereof along its length mechanically securing said wiper element to said backing member, attaching means located intermediate the ends of said backing member securing said backing member to windshield wiper driving means, said backing member having its broad dimension decreasing as the distance from said attaching means increases, whereby the blade is more easily flexed near the end portions thereof.

STANLEY R. CARSON.

REFERENCES CITED

The following references are of record in the file of this patent:

UNITED STATES PATENTS

| Number | Name | Date |
|---|---|---|
| 353,863 | Kaelin | Dec. 7, 1886 |
| 1,498,155 | Dorr | June 17, 1924 |
| 1,699,634 | Smulski | Jan. 22, 1929 |
| 2,090,702 | Rodrick | Aug. 24, 1937 |
| 2,254,343 | Zierer | Sept. 2, 1941 |
| 2,543,383 | Scinta | Feb. 27, 1951 |

FOREIGN PATENTS

| Number | Country | Date |
|---|---|---|
| 206 | Great Britain | Sept. 21, 1911 |
| 427,383 | Great Britain | Apr. 23, 1935 |
| 820,156 | France | July 26, 1937 |